United States Patent [19]

Molusis

[11] 4,149,254
[45] Apr. 10, 1979

[54] METHOD AND APPARATUS FOR FLOW METERING

[75] Inventor: Anthony J. Molusis, Plantsville, Conn.

[73] Assignee: American Chain & Cable Co., Inc., Waterbury, Conn.

[21] Appl. No.: 590,064

[22] Filed: Jun. 25, 1975

[51] Int. Cl.² .......................... G01F 1/88; G06F 15/32
[52] U.S. Cl. .................................. 364/510; 73/194 R
[58] Field of Search ........... 235/151.34; 73/23, 194 R, 73/195, 194 E, 205; 340/347 AD; 364/510

[56] References Cited

U.S. PATENT DOCUMENTS

| | | | |
|---|---|---|---|
| 3,315,524 | 4/1967 | Duffy et al. | 73/194 X |
| 3,323,365 | 6/1967 | Goetz | 73/194 R |
| 3,739,159 | 6/1973 | Nalley | 73/205 R X |
| 3,752,393 | 8/1973 | Moseley | 235/151.34 |
| 3,803,911 | 4/1974 | Shkatov et al. | 73/194 R |
| 3,878,376 | 4/1975 | Sholes, Jr. et al. | 235/151.34 |
| 3,898,882 | 8/1975 | Prokopius | 73/195 X |
| 3,933,038 | 1/1976 | Valentin et al. | 73/194 R |

*Primary Examiner*—Edward J. Wise
*Attorney, Agent, or Firm*—Pennie & Edmonds

[57] ABSTRACT

A method and apparatus are disclosed for calculating gas flow through an orifice using the complete American Gas Association gas flow equation, for selecting specific values to be used in said calculation in accordance with the specific orifice used, and for selectively displaying operating and test parameters.

9 Claims, 2 Drawing Figures

METHOD AND APPARATUS FOR FLOW METERING

BACKGROUND OF THE INVENTION

Gas flow is generally metered by directing the gas through an orifice, measuring its temperature, pressure, specific gravity and the differential pressure across the orifice, and calculating the gas flow using these parameters in the gas flow equation. The American Gas Association's publication "Orifice Metering of Natural Gas" (AGA-3, April 1955, latest reprinting June 1972) sets forth the gas flow equation as follows:

$$Q_h = [F_b\, F_{pb}\, F_{tb}\, F_m\, F_a\, F_1]\, F_g\, F_{tf}\, F_r\, Y\, F_{pv}\, \sqrt{h_w\, P_f}$$

where:
- $Q_h$ = Quantity rate of flow at base conditions: cu.ft./hr
- $F_b$ = Base Orifice Factor, a constant for a given orifice size and pipe diameter
- $F_{pb}$ = Pressure Base Factor, a constant
- $F_{tb}$ = Temperature Base Factor, a constant
- $F_m$ = Manometer Factor, a constant used only for a mercury manometer
- $F_a$ = Orifice Thermal Expansion Factor, a constant over the temperature range of normal interest
- $F_1$ = Gauge Location Factor, a constant used only for a mercury manometer
- $F_g$ = Specific Gravity Factor
- $F_{tf}$ = Flowing Temperature Factor
- $F_r$ = Reynold's Number Factor
- $Y$ = Expansion Factor
- $F_{pv}$ = Supercompressibility Factor
- $h_w$ = Differential Pressure in inches of water
- $P_f$ = Absolute Static Pressure in psia For convenience the product of the six "F" terms in brackets in the equation above is represented below by "F." The specific gravity factor and the flowing temperature factor adjust the equation for gases having a specific gravity other than 1.000 and a temperature other than 60° F. as follows:

$$F_g = \sqrt{1/SG},$$

where SG is the specific gravity of the flowing gas $$F_{tf} = \sqrt{520/(T_f+460)},$$

where $T_f$ is the temperature in degrees Fahrenheit of the flowing gas

The Reynold's number factor takes into account the variations of the discharge coefficient of an orifice with Reynold's number. It is given by:

$$F_r = 1 + (b/\sqrt{h_w P_f}),$$

where b is a constant for a given orifice size and pipe diameter.

The expansion factor corrects for a change in specific weight when a gas flows through an orifice. It depends on the location and type of pressure taps as follows:

Upstream: $Y = 1 - K_1 h_w/P_f$

Downstream: $Y = 1 \pm K_2 h_w/P_f$ where $K_1$ and $K_2$ are constants for a given orifice size and pipe diameter.

The supercompressibility factor accounts for the deviation of natural gas from the ideal gas laws. The standard American Gas Association method for computing such factor is set forth in its publication "Extension of Range of Supercompressibility Tables" (NX-19, December 1962). This method sets forth a table of $F_{pv}$ values for adjusted pressures, $P_{adj}$, and temperatures, $T_{adj}$, where $$P_{adj} = [156.47 \times P] \div [160.8-(7.22 \times SG) + M_c-(0.392 \times M_n)]$$

$$T_{adj} = [226.29 \times (T_f + 460)] \div [99.15 + (211.9 \times SG) - M_c - (1.681 \times M_n)] - 460$$

where
- P = Pressure in psig
- $M_c$ = MOL percent carbon dioxide
- $M_n$ = MOL percent nitrogen Because gas flow through a pipe line typically varies over a very wide range, it has been found desirable to use several orifices to measure flow, an orifice being located in each of several pipes, or "runs," connected in parallel at the point in the pipeline where the gas flow is measured. Thus increases in gas flow through the pipeline are accommodated by opening valves in additional "runs" to permit the gas to flow through. By opening and closing valves in the different runs in step with variations in the gas flow, gas flow through each orifice remains within the range of most accurate measurement. Of course, a separate calculation of the gas flow equation must be made for each different run that is used.

Ordinarily gas flow is calculated every two seconds and the results are accumulated. In practice in the prior art, calculation of the entire gas flow equation every two seconds for as many runs as are used has proven to be too much for the meters used and various terms of the equation have been approximated. Thus, the Reynold's number factor and the expansion factor usually are assumed to be constants and the supercompressibility factor is often approximated by a linear expression. However, with the increasing concern for energy conservation, it has become very important to measure gas flow with the greatest accuracy possible.

At the same time it is often desirable to provide a meter that may be used in different applications with different orifices. Since the orifice constants are different for each case, some means must be provided for entering these constants in the calculator. In the prior art adjustable switches have been used to set different constants for use in calculating the gas flow equation. See, for example, U.S. Pat. No. 3,752,393 to Moseley. However, when one considers that the base orifice factor $F_b$ and the constants, b, and K, used in calculating the Reynold's number factor and the expansion factor are all dependent on the particular orifice used, it is apparent that a large number of switches are needed to enter these constants using the techniques shown in the prior art. In addition, considerable time is required just to read these constants. When one considers that a like number of switches would have to be provided for each run to set the constants in the fashion used in the prior art, it is apparent that the number of switches and the time required to read them are enormous.

SUMMARY OF THE INVENTION

Accordingly, a method and apparatus for gas flow metering has been devised in which the American Gas Flow Association equation is calculated in its entirety every two seconds. Moreover, to ensure accuracy of measurement over a wide range of flow rates, a plurality of separate runs are provided and the runs to be used are selected in accordance with the flow rate that is measured. To expedite the entry of orifice constants into the gas flow meter, all constants for any orifice that may be used are stored permanently in the gas flow meter and the use of a particular set of constants is selected by appropriate switches. Since only a one digit switch need be read in order to enter a full set of constants, reading time is considerably faster and the number of switches is reduced to a manageable number. By improving reading time it is possible to calculate the entire gas flow equation every two seconds even when several runs are used. In addition, to permit continuous on-line monitoring of the meter as well as its testing, a display means and a selection switch are provided for selectively interrogating and displaying various operating and test parameters of the meter.

BRIEF DESCRIPTION OF THE DRAWING

These and other objects, features and elements of the invention will be more readily apparent from the following detailed description in which.

DETAILED DESCRIPTION OF THE DRAWING

Figure 1:
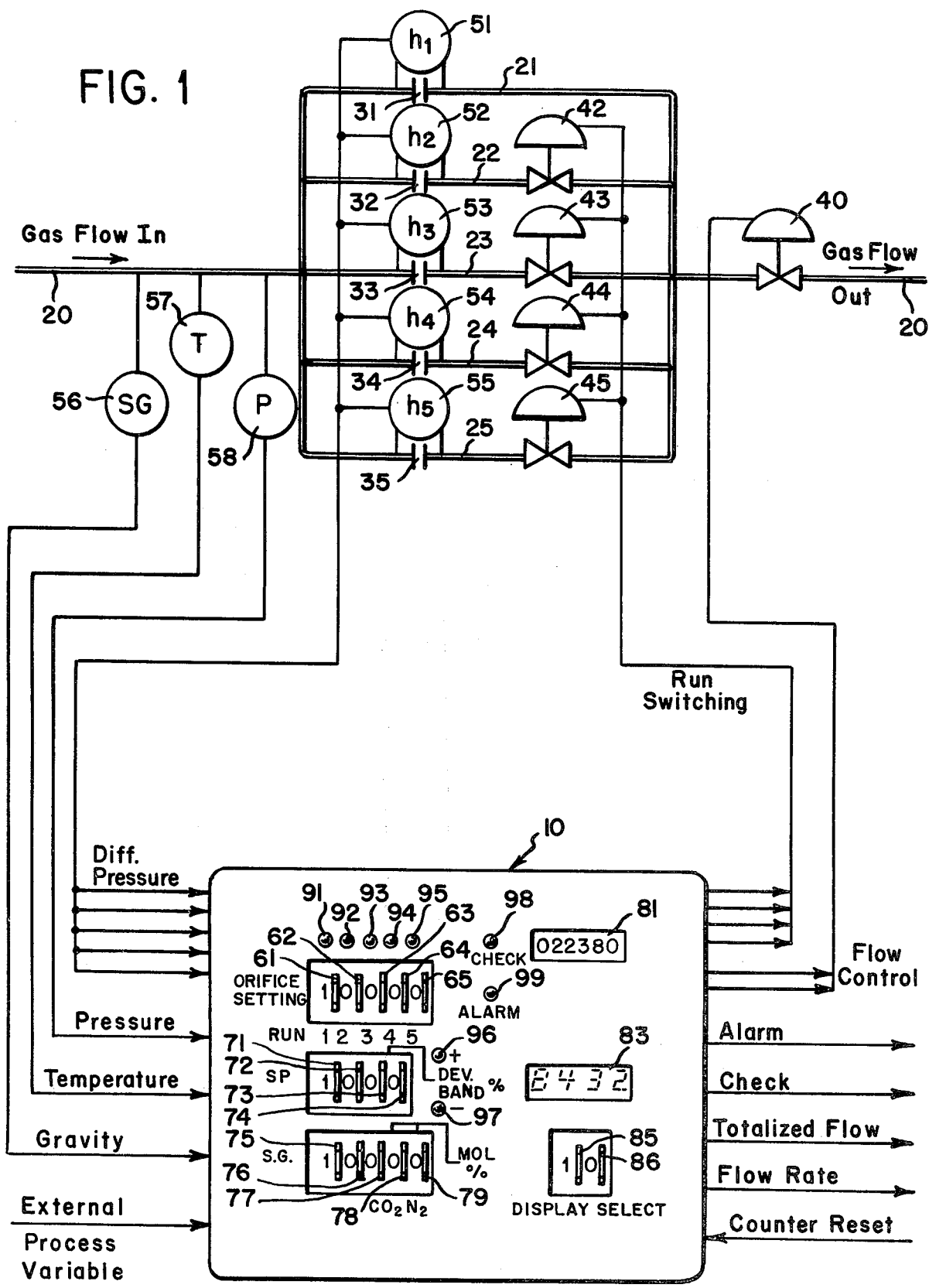
FIG. 1 is a schematic illustration of the inputs and outputs to a illustrative embodiment of the invention.

FIG. 1 depicts an illustrative embodiment of a gas flow meter 10 of the present invention and its connections to a pipeline 20 in which gas flow is being measured. At the point of measurement pipeline 20 is divided into five pipes, or "runs," 21, 22, 23, 24, 25 which are connected in parallel. Within each run there is an orifice 31, 32, 33, 34, 35, respectively, through which the gas is directed; and in four of the five runs there are flow control valves 42, 43, 44, 45, respectively. In addition, in pipeline 20 there is a master flow control valve 40. The parameters needed for calculation of the gas flow equation are measured by the following sensors: differential pressure sensors 51, 52, 53, 54, 55, each of which is connected across an orifice in a run, a specific gravity sensor 56, a temperature sensor 57 and a pressure sensor 58, the latter three sensors being connected to pipeline 20.

In addition to the inputs from the pipeline, there is considerable other information which can be applied to the gas flow meter. Specifically, a set of thumb-wheel switches 61, 62, 63, 64, 65 on the front panel of the meter permit the selection of the base orifice factor, $F_b$; a constant, b, used in the calculation of the Reynold's number factor; and a constant $K_{ave}$ used in the calculation of the expansion factor in accordance with the particular orifice used in each of the five different runs. The constants are stored in the memory of meter 10 at the time of its manufacture. Typically, ten sets of constants corresponding to ten different orifices are stored for each run, the particular orifices being selected by the customer in accordance with his needs. Thus, in the embodiment shown in FIG. 1, as many as 150 different constants may be stored and selected in accordance with the orifice used by setting the appropriate numbers on the thumb-wheel switches.

A second set of thumb-wheel switches 71, 72, 73, 74 permits the selection of a set point on three of these and a percentage deviation band on the remaining switch. These switches provide for the control of flow rate or pressure in pipeline 20 or even an external process variable not used in calculating the gas flow equation. The particular variable to be monitored is connected to the process variable input and is compared to the value on the three set point switches 71, 72, 73 to determine if it is within a deviation band selected by switch 74. A process control output signal is generated on one control output when the variable is above the deviation band and on another control output when it is below the deviation band. As shown in FIG. 1, these outputs are used to control the flow in pipeline 20 by operating valve 40.

A third set of thumb-wheel switches 75, 76, 77, 78, 79 permits one to set the value of specific gravity and the values of the MOL percent carbon dioxide and MOL percent nitrogen used in calculating the gas flow equation. Three digits are used for specific gravity and one each for the two MOL percents. The use of the specific gravity values measured by sensor 56 or that set on thumb-wheel switches 75, 76, 77 in calculating the gas flow equation is selected by a switch (not shown) on the side of meter 10.

Output signals from meter 10 include a totalizing meter 81 as well as an analog signal representative of the totalized gas flow. In accordance with changes in the differential pressure across orifices 31-35, which are related to gas flow, signals are applied to flow control valves 42-45 to select the proper number of runs to measure a given gas flow.

A four digit light emitting diode (LED) display 83 is also provided on the front panel of meter 10 for monitoring and test purposes. As will be explained in more detail below, various operating and test parameters are shown by LED display 83 in accordance with the setting of two thumb-wheel switches 85, 86 that constitute a display select switch. For example, the operating parameters of specific gravity, temperature, pressure and differential pressure are shown by LED display 83 when thumb-wheel switches 85, 86 are set at specific numbers. Similarly, in a test mode various test parameters are displayed in accordance with the setting of the switches. Indicating lights 91, 92, 93, 94, 95 indicate that the corresponding run is operating. Indicating lights 96, 97 turn on when the variable being monitored is above or below the deviation band. Indicating light 98 lights when a test switch is in check position and indicating light 99 is an alarm light which is lit when a run is operating above a specified pressure differential.

Figure 2:
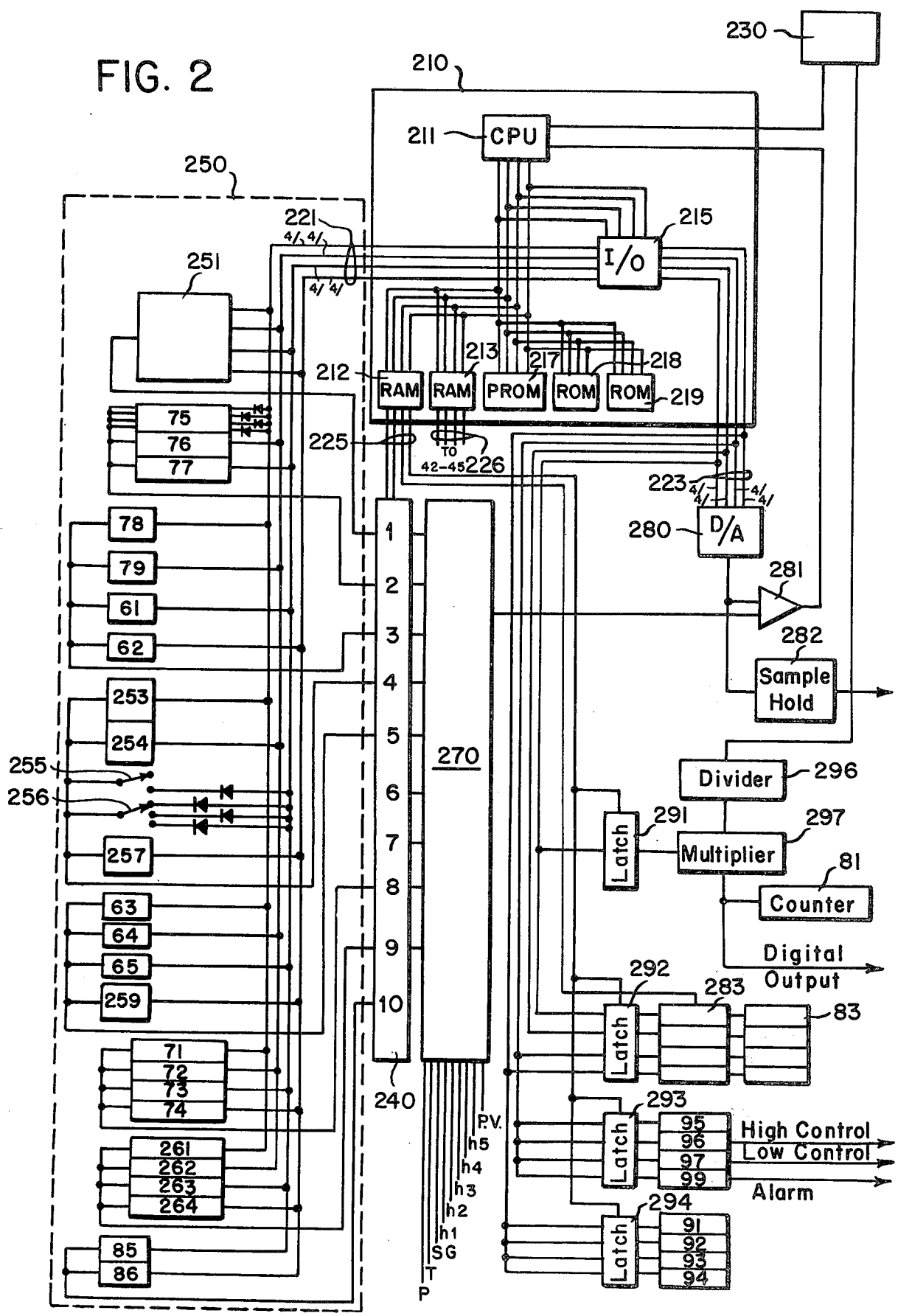
FIG. 2 is a schematic illustration in block diagram form of the illustrative embodiment of FIG. 1.

A block diagram of meter 10 is shown in FIG. 2. The apparatus comprises a central processing unit (CPU) and memory 210, a clock 230, a shift register 240, an array of input switches 250, means 270 for reading analog values, a digital to analog converter 280, a comparator 281, and several outputs identified in FIG. 1. The CPU and memory 210 comprises a microprocessor chip 211 such as the 4004 microprocessor manufactured by Intel Corporation of Sanata Clara, Calif. This is a 4 bit processor that executes forty-five instructions and has its own scratch pad memory and accumulator. Processor 211 directly addresses 640 bits of random access memory (RAM) stored in two RAM units 212, 213, a programmed read only memory (PROM) 217 having a 256 × 8 bit storage capacity and two read only memories (ROM) 218, 219, each having a storage capacity of 2K × 8 bits. Through input/output buffer 215, processor 211 controls four 4 bit input ports 221 and four 4 bit output ports 223. The processor also controls directly a 4 bit output port 225, 226 from each of RAMs 212, 213. In general the organization of CPU and memory 210 follows that set forth in the User's Manual for the MCS-4 Microprocessor Set available from Intel Corporation. Because the details of this Microprocessor Set are well known in the art and extensively described in the User's Manual, they will not be discussed further.

Input bus 221 is a sixteen line bus organized in four 4 bit input ports. It provides the input for all digital signals. For convenience this bus is shown as four lines and the presence of four lines in each line shown is symbolized by the notation "4/." RAMs 212, 213 are each used to store up to 80 × 4 bits for intermediate calculations. The RAM outputs 225, 226 are used to control shift register 240 and various latch circuits in the output as will be explained in more detail below. PROM 217 has a 256 × 8 bit storage capacity and contains all the constants distinctive of a given flow meter. In particular, PROM 217 contains up to 150 orifice constants. ROM 218 contains the executive functions for processor 211 and ROM 219 contains sub-routines, tables for the supercompressibility factor, $F_{pv}$, and a test programm. Output bus 223 provides all output data in the form of binary coded decimal information on four 4 bit ports. Since each such port contains four lines, the presence of these four lines is symbolized by the notation "4/."

Shift register 240 is a 10 bit register such as the Intel 4003 which is controlled by one of the RAMs. The shift register is used as a multiplexing device to read both input switches 250 and the analog inputs from pipeline 20. Every two seconds of operation of meter 10, a single pulse is loaded into position 1 of shift register 240 from one of the lines from the RAM. This pulse is then advanced through each of the ten positions of the shift register by clock signals received by the shift register on a second line from the RAM. At each position in the shift register the pulse enables various input switches 250 and/or reads an analog value from the pipeline.

Input switches 250 comprise a series of switches by which the CPU reads various parameters set by the user of the flow meter. When the pulse in shift register 240 is at position 1, it reads a series of option switches 251 that permit the selection of such features as scaling factors, the use of the value of specific gravity set in thumb-wheel switches 75, 76, 77 or that read by sensor 56, and the use of the set point value set in switches 71, 72, 73. Other option switches permit the value of the temperature to be fixed at 60° F., permit the calculation of density instead of pressure, and make it possible to inactivate the run switching controls for valves 42–45. In each case the switch is read in the form of a single output, or the absence thereof, on one of the sixteen lines in the input bus.

When the pulse in shift register 240 is at position 2, it reads the value of specific gravity set in thumb-wheel switches 75, 76, 77. Each of these switches is wired so as to have four output leads on which appears the binary code equivalent of the decimal value set in the thumb-wheel switch. Each of these leads is connected to a different line in one group of four lines in the sixteen line input bus 221. For purposes of illustration only the wiring for switch 75 is shown in detail and it will be understood that the wiring for all thumb-wheel switches is similar.

In position 3 of the shift register, thumb-wheel switches 78, 79 are read giving the MOL percent carbon dioxide and nitrogen. In addition, thumb-wheel switches 61, 62 are read indicating which of the particular set of orifice values are to be used for runs 1 and 2.

In position 4 of the shift register, switches are read that permit adjustment of the values being calculated over a 10% range, a first switch 253 reading in units and a second 254 in tenths of units. Each switch comprises four on/off switches mounted on the side of meter 10 in which is set the binary code representative of the desired decimal number. The adjustment can be either positive or negative in accordance with a sign switch 255. Scaling of the output by factors of 0.1, 1 and 10 is provided by a scaling switch 256. Finally, a trip point switch 257 is read which sets the value of the differential pressure for which a run will be shut-off when the differential pressure falls below it.

When the signal in shift register 240 is in position 5, thumb-wheel switches 63, 64, 65 are read indicating which of the particular orifice values are to be used for runs 3, 4 and 5. In addition, a run cutoff switch 259 is read which permits the selection of a value of the pressure differential for which flow is assumed to be zero. In position 8 the set point and deviation set in switches 71–74 are read. In position 9 an output scaling factor is read from four sets of on/off switches 261, 262, 263, 264 similar to switches 253, 254 and also mounted on the side of meter 10. This factor is used to adjust the level of analog voltage or current output to desired limits. Finally, in position 10 the two thumb-wheel switches 85, 86 that constitute the display select are read.

Analog values are read by means 270 in accordance with the signal from shift register 240. The order of reading is: pressure, temperature, specific gravity, $h_1$, $h_2$, $h_3$, $h_4$, $h_5$, and the external process variable, where h is the differential pressure across an orifice and its subscript is the run number. Each analog value is read in response to a signal at a different bit position in the shift register. Numerous means for effecting the gating of such signal will be apparent to those skilled in the art and in the interest of brevity will not be discussed further.

The analog signals that are read are converted to digital signals by means of a comparator 281 and digital-to-analog converter controlled by a program stored in CPU and memory unit 210. Briefly, CPU and memory unit 210 first generates the binary coded decimal number "9" on the four lines of that output port in output bus 223 which is the most significant digit. Converter 280 converts this to an analog value and comparator 281 compares this with the analog value from analog reading means 270. If the signal from converter 280 is too high, it is decremented by one and the process is repeated until the signal from converter 280 is less than that from analog reading means 270. This process is then repeated for each of the less significant digits until comparison is achieved. At this point the display value being applied to converter 280 is read by the CPU and memory unit 210 and utilized in the calculation of the gas flow equation. The comparison signal from comparator 281 is fed back to CPU and memory unit 210 via the CPU test line which is simply monitored by the subroutine used for A/D conversion to detect the output of comparator 281.

Digital outputs from the CPU and memory unit 210 are also converted to analog signals by converter 280 which is multiplexed between its D/A output function and its A/D input function through a sample/hold circuit 282. The analog output signal is a voltage signal which can be converted to an analog current signal if desired. As used in flow meter 10, this output signal is proportional to total flow rate.

A digital output signal is taken from ROM output bus 223 and is multiplexed by a series of latches 291, 292, 293, 294 controlled by an output from RAM 212. Latch 291 multiplexes counter 81 which is a six digit mechanical counter for totalized flow. The signal from clock 230 is divided down by divider 296 to five Hertz, or ten pulses during every two second machine cycle. When flow meter 10 calculates the flow, it adds it to an internal six digit total. The most significant digit in the value of the flow that is calculated plus the overflow, if any, from the internal total is applied through latch 291 to a multiplier 297 which applies to counter 81 in every two second period the same number of pulses as the most significant digit plus any overflow. The pulse output to counter 81 is also made available on a separate lead. Latch 292 and still another output from RAM 212 multiplex LED drive circuits 283 for LED display 83. Latches 293, 294 multiplex indicating lights 91–97 and 99 as well as the high and low control contacts that are connected to indicating lights 96, 97 and the alarm contact connected to indicating light 99. Not shown in FIG. 2 is indicating light 98 which is controlled by the test switch to which it is connected.

Flow meter 10 calculates the gas flow equation under control of the executive program and sub-routines stored in ROMs 218, 219. The executive program performs preconditioning and calls up various sub-routines to read information, perform calculations, and produce an output. The various sub-routines include addition, subtraction, multiplication, division, floating point division, square root, BCD to binary conversion, clock pulse, analog to digital conversion, digital input, table look up, transfer, clear and output. Sub-routines are also provided for controlling the LED display and for executing such features as the control of the number of runs in accordance with the flow of gas in the pipeline.

To calculate the gas flow equation, signals are first applied to the two lines to shift register 240 to load a pulse into position 1. In this position option switches 251 are read by successively reading each of the four input ports 221 into an accumulator in processor 211 and writing the contents of the accumulator into a register in the random access memory. Thus the status of the various option switches is stored for later use in deciding which way to go in calculating various elements of the gas flow equation.

The first analog quantity to be read is a voltage signal from pressure sensor 58. This signal is a one to five volt signal proportional to the pressure. This signal must be converted to two different engineering values, the first in psig for LED display 83 and the $F_{pv}$ calculation, and the second in psia to be used as a value of $P_f$ in the gas flow equation. The formulas used are:

$$P' = C_1 \times (P - 1.000) \pm C_2$$

$$P_f = P' + C_3$$

where:
P is the 1 to 5 volt signal
P' is in psig
$P_f$ is in psia
$C_1 = (P_u - P_1)/4$
$C_2 = P_1$
$C_3 = P_{atm}$ where:
$P_u$ is the upper value of pressure sensor 58,
$P_1$ is the lower value of pressure sensor 58; and
$P_{atm}$ is the atmospheric pressure.

To accomplish this calculation, flow meter 10 first looks up the constants which are stored in PROM 217, then digitizes the analog signal from sensor 58 and finally calculates the values of P' and $P_f$. These two values are then stored in a register in random access memory and the value of P' is also provided to the output to LED display 83.

Next, a clock pulse is applied to shift register 240 to advance the signal to position 2. This begins the calculation of temperature. Two separate values are needed, one in °F. for the LED display and the $F_{pv}$ calculation, and the other in °Rankine for the $F_{tf}$ factor. The formulas used are:

$$T' = C_1(T - 1.000) \pm C_2$$

$$F_{tf} = 520/(460 + T')$$

where:
T is the 1 to 5 volt temperature signal
T' is in °F.
$C_1 = (T_u - T_L)/4$
$C_2 = T_L$ where:
$T_u$ = upper value of temperature sensor 57, and
$T_L$ = lower value of temperature sensor 57.

The status of the option switch that chooses between the use of a fixed temperature or that registered by sensor 57 is first ascertained by reading the signal from its register in random access memory and testing it for a one or a zero. If the temperature is to be fixed, $F_{tf}$ is set equal to one and T' is set equal to 60° F. Otherwise, the analog signal from temperature sensor 57 is digitized, the constants used are looked up in PROM 217, and $F_{tf}$ and T' are calculated using the above equations. The value of T' is then stored in random access memory and is also made available to the output to the LED display. The value of $P_f$ stored in random access memory is then multiplied by the value of $F_{tf}$ and the product is also stored in the random access memory.

The gravity factor $F_g = \sqrt{1/SG}$ may be calculated from the analog gravity input or the reading from thumb-wheel switches 75, 76, 77. The formula used to calculate the specific gravity, SG, is:

$$SG' = C_1(G - 1.000) + C_2$$

where:
SG' is the specific gravity
G is the 1 to 5 volt input signal
$C_1 = (G_u - G_L)/4$
$C_2 = G_L$
where:
$G_u$ = upper value of the specific gravity sensor 56, and
$G_l$ = lower value of the specific gravity sensor 56.

Again, the status of the option switch that chooses between the switch value and sensor 56 is read from its register in random access memory and tested. If the switch value is to be used, thumb-wheel switches 75, 76, 77 are then read because the signal in shift register 240 is still at position 2. After the thumb-wheel switches are read, a clock pulse is then applied to shift register 240 to shift the signal to position 3. In the alternative, if sensor 56 is to be read, the clock pulse is first applied to the shift register to shift the signal to position 3. The analog signal from specific gravity sensor 56 is then digitized, the constants used in the above equation are retrieved from PROM 217, and the value SG' is calculated. Finally, $F_g$ is calculated.

Flow meter 10 next calculates the supercompressibility factor $F_{pv}$. First, thumb-wheel switches 78, 79 which specify the MOL percent carbon dioxide and nitrogen and switches 61, 62 which identify the orifice values used for runs 1 and 2 are read and the values read from switches 61, 62 are transferred to registers in random access memory. The constants used in calculating the adjusted pressure and temperature values $P_{adj}$ and $T_{adj}$ are then read from PROM 217 and these adjusted values are calculated.

The tables stored in ROM 219 contains values of $T_{adj}$ in 10° F. increments and values of $P_{adj}$ in increments of 100 psig.

These values are interpolated to obtain $F_{pv}$ and this value is made available to LED display 83. $F_{pv}$ is then multiplied by $\sqrt{P_f F_{tf}/SG'}$ to produce an intermediate product X, which is stored in random access memory.

A clock pulse is next received by shift register 240 to advance the signal to position 4. This causes adjustment switches 253, 254, sign switch 255, scaling switch 256 and trip point switch 257 to be read. Information from the scaling switch and the trip switch is stored in random access memory. The signals from switches 253, 254, 255 are then used to adjust the value X by the amount $(1 \pm K_t)$ where the use of the positive or negative sign is determined in accordance with sign switch 255 and $K_t$ has the value 0.0ab, where a is the number set in switch 53 and b is the number set in switch 254. The resulting value, X', is then stored in random access memory.

At this point flow meter 10 is ready to make those calculations which depend on the particular parameters of the orifices used in the five different runs 21–25. The signal from the differential pressure sensors 51-55 is an analog signal ranging from 1 to 5 volts corresponding to a differential pressure of zero to a maximum pressure in inches of $H_2O$. The formula used to calculate the differential pressure $h_w$ is:

$$h_w = C_1 \times (h - 1.000)$$

where:
  $h_w$ is the one to five volt signal, and
  $C_1 = h_{max}/4$
    where:
    $h_{max}$ is the maximum value of the differential pressure sensor 51-55.

The analog signal from differential pressure sensor 51 is first digitized, and the value (h−1.000) is calculated and saved. The value read from switch 61, which identifies the particular set of orifice constants to be used, is then retrieved from random access memory and the program enters a subroutine for completing the calculation of the flow in a run.

The constant $C_1$ used in calculating $h_w$ is retrieved from PROM 217 and this calculation is performed. The resulting value is tested to make sure that it is less then 98% of $h_{max}$ and this value is provided as an output to LED display 83. If $h_w$ is greater than 98% of $h_{max}$, a signal is provided for the alarm output. The square root of $h_w$ is then calculated as well as the product $h_w \times P_f$ and the square root of this product. At this point, the program retrieves the values F, b and $K_{ave}$ from storage in PROM 217 in accordance with the value set in switch 61. The value F is a composite factor of the six F terms set forth in brackets in the discussions of the gas flow equation in the background of this invention and therefore accounts for the base orifice factor, $F_b$, which varies for each orifice. This composite term is made available as an output to LED display 83. Next, the value b is used to calculate $F_r$; and the value of $F_r$ is provided to LED display 83. The product $F_r \times \sqrt{h_w}$ is then calculated; this is multiplied by X' and the result is multiplied by F and saved. The expansion factor is then calculated using the formula:

$$Y = 1 \pm 4 K_{ave} (h_w/p_f),$$

where $K_{ave}$ is the constant stored in PROM 217 and is derived using an approximation to the general equation for the expansion factor. For all upstream taps, the minus (−) sign is used in this equation. For downstream flange taps, the plus (+) sign is used. For downstream pipe taps, the plus sign is used if the ratio of the orifice diameter to pipe diameter is $\leq \frac{1}{2}$; otherwise the minus sign is used. The value of the expansion factor Y is then provided to LED display 83. Finally, the value Y is multiplied by the previously-calculated value ($F_r\sqrt{h_w}$ X' F) to determine the total flow, $Q_n$. This value is then provided to LED display 83 and also to an internal totalizer in flow meter 10. At this point, the operation of the subroutine is finished and control returns to the main program.

A clock pulse is then applied to shift register 240 to advance the signal stored therein to position 5 and the analog signal from differential pressure sensor 52 is digitized. The values set in switches 63, 64, 65 and run cut-off switch 259 are then read and transferred to registers in random access memory. Next, the value read from switch 62 is retrieved from random access memory and the program enters its subroutine for calculating the flow in run 2. The flow that is calculated is then added to the internal totalizer in flow meter 10. At the end of the execution of this subroutine, the signal in shift register 240 is advanced by a clock pulse to position 6 and the analog signal from differential pressure sensor 53 is digitized. The value read from switch 63 is then retrieved from random access memory and the program again enters its subroutine for the calculation of flow in run 3. The same process is repeated for runs 4 and 5 to calculate these flows with the signal in shift register 240 in positions 7 and 8, respectively.

Upon returning from the fifth execution of the run subroutine, the program initially tests if it is to use the process control and run-switching options and executes these options if required to do so. In the course of executing the process control option, the signal in shift register 240 is advanced to position 9. If this option is not executed, the main program provides a clock pulse to advance the signal to position 9. The program then provides the totalized flow to LED display 83 and then scales this flow in units per hour or day as well as the scaling factor read from scaling switches 256. Analog output scaling switches 261-264 are then read and the product of this value and the totalized flow is calculated.

A clock pulse then advances the signal in shift register 240 to position 10 and display select switches 85, 86 are read and their contents stored in random access memory. This information is used during execution of a following machine cycle to select for display one of the many different outputs that were provided for LED display 83. The analog output signal is prepared by converting the digital signal to an analog signal in D/A converter 280 and providing this signal to sample hold circuit 282. Information signals to indicating lights 91–97 and 99 are also prepared.

A final clock pulse to shift register 240 then clears the shift register. The signals that control indicating lights 91–97 and 99 are then applied to latches 293, 294. At this point, execution of the program is complete and it returns to start.

The details of the programs and subroutines required to execute the foregoing calculations of the gas flow equation will be apparent to anyone skilled in the art. Illustrations of certain of these subroutines are set forth as follows. The constants F, b, and $K_{ave}$ are obtained from bits stored in PROM 217. To understand the execution of this subroutine, it is helpful to know that CPU 211 has sixteen 4 bit registers, numbered from 0 to 15; and that these registers are paired off in 8 pairs numbered from 0 to 7 with pair 0 containing registers 0 and 1, etc. It should also be noted that any digits to be looked up at any one time are all stored in order, one pair of digits after another, with the least significant digit first. The subroutine begins by loading pair 2 with the address of the RAM register in which the least significant digit of the PROM constant is to be placed, and by loading pair 0 with the address in the PROM of the least significant digit of the constant to be retrieved. Register 15 is then loaded with a number equal to 16 minus the number of pairs of digits that are to be looked up.

The subroutine then jumps to a second subroutine that looks up these digits. Using the "Fetch Indirect From ROM" (FIN) instruction available in the Intel microprocessor, CPU 211 reads the contents at the address specified in pair 0 into pair 3 and then jumps to a subroutine for transferring two digits to the RAM. Under control of this subroutine, the contents of register 7 in pair 3 are loaded into the accumulator, the contents of the accumulator are written into the RAM register, whose address is pointed to by pair 2, the address stored in pair 2 is incremented by 1, the contents of register 6 are loaded into the accumulator, the contents of the accumulator are written into the RAM register whose address is now pointed to by pair 2 and, finally, the address stored in pair 2 is again incremented by 1.

Control is then returned to the subroutine for looking up constants. Since the contents at the address identified by pair 0 have now been read, the contents of pair 0 are incremented by 1 and the contents of register 15 are incremented by 1. Register 15 is then tested to see if the look up of all digits required is completed. If not, the program recycles back to the FIN instruction.

The LED output subroutine is executed each time that an output is provided to the LED display. During each machine cycle only one parameter is displayed by LED display 83, the particular parameter depending on the setting of display select switches 85, 86 during a previous machine cycle. The setting of these display switches is read when the signal in shift register 240 is at position 10. This information is then stored and used during a following execution of a machine cycle. Each time the program reaches an output to the LED display, the value set in the display switches and stored in the computer is decremented by 1. When this value reaches 0, the data provided is read a digit at a time from temporary storage in RAM to the appropriate one of the four output ports 223. Finally, a clock pulse is applied on the appropriate output lead from RAM 212 to enable the drivers 283 for LED display 83.

The process control subroutine begins when the signal in shift register 240 is at position 8. It should be understood that the set point value is a relative value in the form ab.c% of the input signal, where a, b, c are the values set in switches 71, 72, 73. First it reads the set point and deviation stored in switches 71–74. Next it applies a clock pulse to shift register 240 to advance the signal to position 9; and it digitizes the voltage signal applied to the process variable input lead. It then converts this signal to a percentage value which it provides to the LED display and then determines if the input value, in percent, is above or below the set point ± the allowable deviation. If such deviation is detected, appropriate output signals are applied to energize indicating lights 96, 97 and the high and low control outputs.

Upon returning from the control subroutine, the main program immediately tests for use of the run switching subroutine. This subroutine selects the optimum number of runs to be used as a function of the flow through pipeline 20. For maximum accuracy, the differential pressure transducers 51–55 should operate near their maximum value. The run-switching subroutine achieves this by selecting the minimum number of runs that should be used at a given instant without overranging the differential pressure transducer. To prevent overranging, a high-trip point is programmed into the calculation which will switch the next run into service when any pressure differential reaches 98%. To maximize accuracy, a low-trip point having values of 10 to 90% of the pressure differential in 10% increments is selected by trip point switch 257. To expedite calculation, the pressure differentials in the different runs are assumed to be the same and it is further assumed that the effects of using a different number of runs can be compared simply by comparing the product $\Sigma F_n \sqrt{h} = a$ with the product $\Sigma F_{n-1} \sqrt{h^*} = b$, where $\Sigma F_n$ is the sum of the F factors for the runs in service, $\Sigma F_{n-1}$ is the sum of the F factors for all runs in service when the nth run is switched off, h is the pressure differential in the first run, and h* is the value set on trip point switch 257.

First, the subroutine tests to see if the alarm signal is on. If it is an additional run is switched on under control of the appropriate output lead from RAM 226, a different output lead being connected to each of valves 42–45. If the alarm signal is not on, the values a and b identified above are calculated and compared. If a is less than b the flow rate can be handled with one less run and the pressure differential after switching to one less run will be approximately equal to the setting in trip point switch 257. Accordingly, the Nth run is shut down.

A test program is also provided for monitoring all inputs and outputs in an off-line condition. The program is activated by moving a jumper from one point to another on one of the circuit boards. The various inputs and outputs are tested selectively in accordance with the setting of thumbwheels 85, 86 in the display select switch. As in the case of the operation of the meter to calculate the gas flow equation, the display select switch is read into CPU 211 by clocking a pulse through shift register 240 to position 10. The test program first tests the most significant digit set in thumbwheel switch 85. If this is a zero it tests LED display 83. If it is a one it tests the analog inputs; a two causes a test of the switch inputs; a three tests the rate multiplier; a four tests the analog outputs; a five tests panel indicating lights and contact outputs.

The test of the LED displays checks the least significant digit set in thumb-wheel switch 86 for a zero. If these is a zero the number 8888 is provided as output to the LED display checking the operation of all the elements in the light emitting diodes. Any other number set in switch 86 produces the output − .0.0.0 to display 83. This checks the decimal points and the minus sign as well as the operation of the circuitry that generates them. The analog input test operates in similar fashion to the LED display that occurs during operation of the main program. The value of the display set in switch 86 is stored in a register. A clock pulse is loaded into shift register 240 and the analog input at position one is read. If the value set in the register is zero, the digitized value is provided as an output to LED display 83. Otherwise, the value set in the register is decremented by one and the signal in shift register 240 is advanced one more position by applying a clock pulse to shift register 240 to cause the analog value associated with position 2 to be read. The decremented value stored in the register is then tested for zero to determine if these is to be an output. This process is repeated for the full nine cycles needed to read the inputs. The digit input test operates in similar fashion to read the digit inputs set in input switches 250.

The remaining tests need not be described in detail. The rate multiplier test checks multiplier 297 by providing the value set in switch 86 to the rate multiplier. The analog output is tested by applying the four digit number set in switches 75-78 to the D/A converter for the analog output and also displaying it on display 83. The panel indicating lights 91-97, 99 and their associated contact outputs, and run switching outputs to valves 42-45 are tested by applying a signal to each one in turn over a 24 second interval.

As will be apparent to those skilled in the art, the invention may be practiced using many different devices and techniques that are the equivalent of those described above. For example, in cases where a binary instead of a BCD number system is used the analog-to-digital conversion technique can readily be implemented using a binary number system instead of a BCD number system. As will be evident, the comparisons that are made can be implemented by increasing each digit from zero instead of decrementing each digit from nine and it will be understood that one is the equivalent of the other.

In conclusion it should be emphasized again that one of the advantages of the present system is the storage of the orifice constants $F_b$, b and $K_{ave}$ in memory. This makes it possible to select the constants for all five runs using only 12½% of the digital input capacity of shift register 240. If, for example, all these constants were set using panel switches and four digits were used for each constant, it would require 150% of the total capacity of the shift register just to read this information. Thus, by storing the constants in memory, it is possible to use a relatively small shift register and to input the information early in the machine cycle thereby ensuring that the gas flow equation can be calculated in its entirety in less than two seconds.

What is claimed is:

1. Apparatus for measuring the flow of gas through a pipe comprising:
   means for monitoring at least the pressure of said gas and the differential pressure of said gas across an orifice of said pipe;
   digital electronic means for calculating a gas flow equation to determine the flow of gas through said pipe, said equation including terms for the flow of said gas, the differential pressure and at least one constant term that varies with the particular orifice used in said pipe,
   means for applying to said digitial calculating means signals representative of at least the pressure of said gas and the differential pressure;
   means for storing a plurality of values used in determining said constant term, each value corresponding to a different orifice; and
   means for selecting which of said values is to be used in calculating the gas flow equation in accordance with which one of a plurality of orifices is used in said pipe and for applying said value to the electronic calculating means.

2. The apparatus of claim 1 wherein said storing means comprises means for storing a plurality of values of at least one of the following constants: the base orifice factor, a constant used in the calculation of a Reynold's number factor, and a constant used in the calculation of an expansion factor.

3. The apparatus of claim 1 wherein said storing means comprises means for storing a plurality of values of each of the following constants: the base orifice factor, a constant used in the calculation of a Reynold's number factor, and a constant used in the calculation of an expansion factor.

4. The apparatus of claim 1 wherein said storing means is a fixed memory in which a plurality of values of each of the following constants is permanently stored: the base orifice factor, a constant used in the calculation of a Reynold's number factor, and a constant used in the calculation of an expansion factor.

5. The apparatus of claim 1 wherein gas flow is measured through a plurality of orifices, an orifice being located in each of several pipes connected in parallel and the gas flow equation is calculated by calculating the gas flow through each orifice and summing the result, said apparatus further comprising:
   means for each of the parallel connected pipes for independently selecting from a plurality of values at least one value for use in calculating the gas flow equation, said selection being made in accordance with which one of a plurality of orifices is used in said pipe.

6. The apparatus of claim 5 further comprising means for regulating gas flow through individual ones of the parallel-connected pipes in accordance with the gas flow as measured by said meter.

7. The apparatus of claim 1 further comprising:
   visual display means;
   display select means for selecting interrogating said apparatus; and
   means for reading said display select means and for providing an output signal from said digital calculating means to said display means in accordance with what is read from said display select means.

8. The apparatus of claim 7 further including means for displaying values of the terms in the gas flow equation as said values are being measured or calculated.

9. The apparatus of claim 7 further including means for displaying values representative of selected input or output signals, whereby the meter may be tested.

* * * * *

UNITED STATES PATENT AND TRADEMARK OFFICE
CERTIFICATE OF CORRECTION

PATENT NO. : 4,149,254

DATED : April 10, 1979

INVENTOR(S) : Anthony J. Molusis

It is certified that error appears in the above-identified patent and that said Letters Patent are hereby corrected as shown below:

Column 13, line 9, delete "these" (first word) and substitute therefor --there--,
line 27, after "if" delete "these" and substitute therefor --there--.

Column 14, in the third line of claim 7, after "for" delete "selecting" and substitute therefor --selectively--.

Signed and Sealed this

Thirty-first Day of July 1979

[SEAL]

Attest:

LUTRELLE F. PARKER

*Attesting Officer*  *Acting Commissioner of Patents and Trademarks*